(No Model.)
L. E. KRETZMEIER.
SCHOOL SEAT AND DESK.
No. 530,950. Patented Dec. 18, 1894.
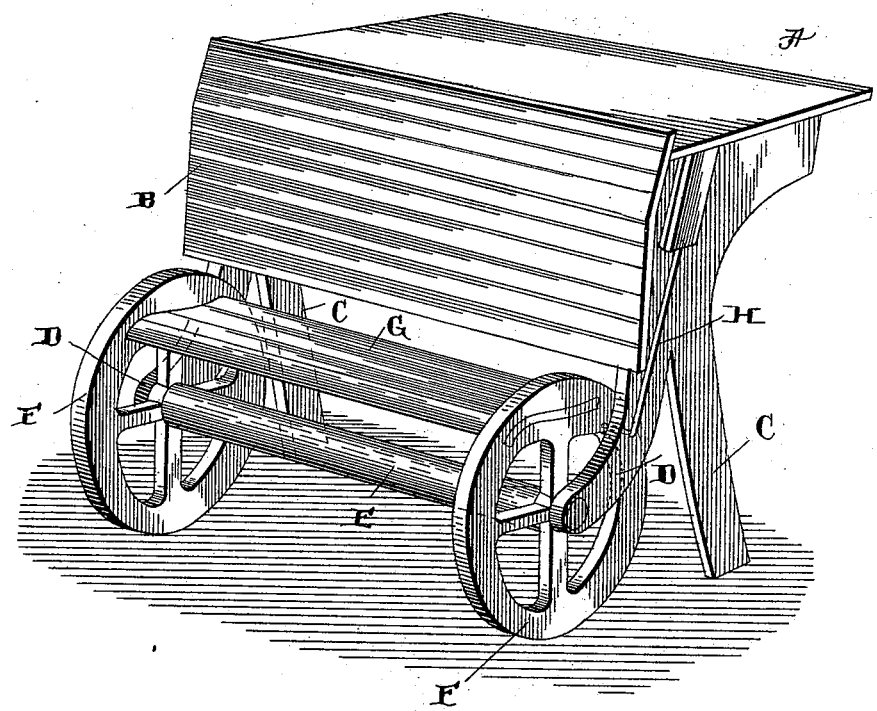
WITNESSES
Geo. E. Frech
James W. Berard
INVENTOR
L. E. Kretzmeier
per
Lehmann Pattison Nesbit Attys

UNITED STATES PATENT OFFICE.

LEWIS E. KRETZMEIER, OF LAWRENCEVILLE, INDIANA.

SCHOOL SEAT AND DESK.

SPECIFICATION forming part of Letters Patent No. 530,950, dated December 18, 1894.

Application filed August 30, 1894. Serial No. 521,729. (No model.)

*To all whom it may concern:*

Be it known that I, LEWIS E. KRETZMEIER, of Lawrenceville, in the county of Dearborn and State of Indiana, have invented certain new and useful Improvements in School Seats and Desks; and I do hereby declare the following to be a full, clear, and exact description of the invention, such as will enable others skilled in the art to which it pertains to make and use it, reference being had to the accompanying drawing, which forms part of this specification.

My invention relates to an improved school seat and desk; and the object of the same is to provide an improved revoluble seat support which will serve as a caster or wheel for moving the desk.

The invention consists in the novel features of construction hereinafter fully described and claimed, and illustrated by the accompanying drawing which is a perspective view of my improved seat and desk.

A designates the desk proper and B the back on the forward side thereof. The rear legs C of the desk project downward to the floor in the usual manner while the forward legs D are considerably shorter and form bearings for the axis E of the rigidly connected wheels F. These wheels are adapted to turn between the forward legs or bearings of the desk and immediately beneath the back B, and arranged between these wheels and in proper form is the seat G which when turned to the position shown in the drawing is in the correct relative position to the back B. The seat is so held by the spring catch H projected through the bearing and engaging one of the wheels as shown.

While I here show and describe the revoluble seat in connection with a desk, it is apparent that the same may be used with any form of support for resting on the floor, and the same may be provided with a back or it may be omitted if desired.

A school seat and desk such as herein shown and described may be very easily and conveniently moved from place to place in the room when the same is being cleaned as well as when it is desired to change the permanent position of the desks; and the desk may be readily turned over or forward on the axis of the wheels and thus conveniently expose all portions of the floor for sweeping.

Having thus fully described my invention, what I claim as new, and desire to secure by Letters Patent, is—

1. The combination of a support adapted to rest on the floor, wheels rotatable on the floor and journaled to the support, and a seat secured to and revoluble with the wheels, substantially as shown and described.

2. The combination of a support adapted to rest on the floor, bearings thereon, wheels rotatable on the floor and journaled in the bearings, and the seat G extended between the wheels and secured at its ends thereto between the centers and peripheries of the wheels, substantially as shown and described.

3. The combination of a desk, legs upon its rear side for resting on the floor, the forward legs D forming bearings, and a seat carrier revoluble on the floor which is positioned between and journaled in said bearings, substantially as shown and described.

In testimony whereof I affix my signature in presence of two witnesses.

LEWIS E. KRETZMEIER.

Witnesses:
JACOB HOFFMAN,
ADAM BAERSTLER.